United States Patent [19]

Watanabe et al.

[11] Patent Number: 5,003,332
[45] Date of Patent: Mar. 26, 1991

[54] ELECTRICALLY OPERATED CAMERA WHICH SELECTIVELY INHIBITS SHUTTER RELEASE BASED ON FILM PRESENCE

[75] Inventors: Naoki Watanabe, Kawasaki; Tatsuo Amanuma, Ageo; Yoshiaki Ohtsubo, Inba, all of Japan

[73] Assignee: Nikon Corporation, Tokyo, Japan

[21] Appl. No.: 504,657

[22] Filed: Apr. 3, 1990

[30] Foreign Application Priority Data

Apr. 5, 1989 [JP] Japan .................................. 1-40406[U]

[51] Int. Cl.$^5$ ................................................ G03B 1/12
[52] U.S. Cl. .................................. 354/173.1; 354/214; 354/217
[58] Field of Search .................... 354/173.1, 214, 217, 354/21, 173.11, 218

[56] References Cited

U.S. PATENT DOCUMENTS 4,853,731  8/1989  Tsujimura et al. ............... 354/173.1

*Primary Examiner*—L. T. Hix
*Assistant Examiner*—Cassandra C. Spyrou

*Attorney, Agent, or Firm*—Shapiro and Shapiro

[57] ABSTRACT

An electrically operated camera having a release means for effecting a shutter release action for the light exposure of film is capable of determining whether a film is loaded or not in the basis of the film feeding condition. A film feed detection means detects the action of a film being rewound by a film rewind means, and generates a signal upon detection. When a controller receives the signal during the film rewind action, the controller prevents the release means from effecting shutter release after the completion of the rewind action. When no signal is received during the rewind action, the controller permits the release means to effect shutter release after the completion of the rewind action. The action of the film feed condition may alternatively be detected when it is being wound by a film wind means. If it is determined that the camera is loaded with a film, release lock is effected so as to prevent the exposed frame from being subjected to any further exposure by the user. If a film unloaded state of the camera is determined, it can perform the release action, thereby facilitating the checking of its various actions.

6 Claims, 4 Drawing Sheets

ELECTRICALLY OPERATED CAMERA WHICH SELECTIVELY INHIBITS SHUTTER RELEASE BASED ON FILM PRESENCE

BACKGROUND OF THE INVENTION

1. Field of the Invention

The present invention relates to an electrically operated camera having a means for detecting the film feed condition that is capable of determining whether a film is loaded or not on the basis of the output of the detection means.

2. Related Background Art

Among conventional electrically operated cameras, cameras of a certain type are known, which have a film detection switch (hereinafter abbreviated as "film detection SW") for determining the presence or absence of film, as well as a feed detection switch (hereinafter abbreviated as "free sprocket-hole SW") for determining the film feed condition, and which are thus adapted to determine the presence or absence of film and the film feed condition separately.

Such a conventional camera, however, entails high production cost because it is provided with both a film detection SW and a free sprocket-hole SW. In order to lower production cost, cameras of a different type are known, in which the film detection SW is omitted, and the presence or absence of a film is determined on the basis of the presence or absence of a free sprocket-hole signal (hereinafter abbreviated as "FSS"), a single signal thus being used for both functions.

In a conventional camera of this type, after the completion of one photography operation by the user, a film rewind action is automatically effected. Also, release lock is effected so that no shutter release can take place even when the user inadvertently actuates the shutter release button, thereby preventing the exposed frame of the film from being subjected to any further photography exposures.

The conventional camera, however, entails the following problem because the presence or absence of film is determined on the basis of the presence or absence of the FSS in the free sprocket-hole SW. When the release button is actuated when no film is loaded in the camera, since no FSS is detected during the film winding action, it is erroneously determined that the terminal end of the film has been reached, and the film rewind action automatically takes place. After the completion of the film rewind action, the camera is brought to its release lock state, as it is when a film is loaded and release lock is effected after the completion of the film rewind action.

In brief, the conventional camera is such that it is brought to its release lock state after a film rewind action, whether it is loaded with a film or not. This is disadvantageous in that, when it is necessary to check various actions of the camera while no film is loaded therein, the checking can be hindered by the release-lock state of the camera, in which it provides substantially no action.

SUMMARY OF THE INVENTION

The present invention has been accomplished in view of the above-described problem of the prior art. It is an object of the present invention to provide an electrically operated camera adapted to determine the presence or absence of film on the basis of an FSS indicative of the film feed condition, the camera being capable of permitting a release action in response to a release actuation by the user when no film is loaded in the camera.

According to one aspect of the present invention, an electrically operated camera includes a control means which, if a film loaded state of the camera is determined during a film rewind action, forcibly prevents a shutter release action from being effected after the completion of the film rewind action, whereas, if a film unloaded state is determined during a film rewind action, the control means permits a shutter release action to be effected after the completion of the film rewind action.

According to another aspect of the present invention, an electrically operated camera includes a control means which, if a film loaded state of the camera is determined during a film wind action, forcibly prevents a shutter release action from being effected after the completion of a film rewind action, whereas, if a film unloaded state is determined during a film wind action, the control means permits a release action without effecting a film rewind action.

According to the present invention, the arrangement of the camera is such that a determination is made as to whether a film is loaded or not; and release lock is effected if a film is loaded in the camera, whereas release lock is not effected if no film is loaded, thereby allowing the checking of various actions of the camera.

BRIEF DESCRIPTION OF THE DRAWINGS

FIGS. 1 to 4 illustrate embodiments of the present invention, in which

FIG. 1 is a block diagram of a system for controlling the operation of a camera according to the present invention; and FIGS. 2 to 4 are flowharts showing the processing procedure.

DESCRIPTION OF THE PREFERRED EMBODIMENTS

The preferred embodiments of the present invention will now be described with reference to FIGS. 1 to 4.

CONSTRUCTION OF ELECTRICALLY OPERATED CAMERA

Figure 1:
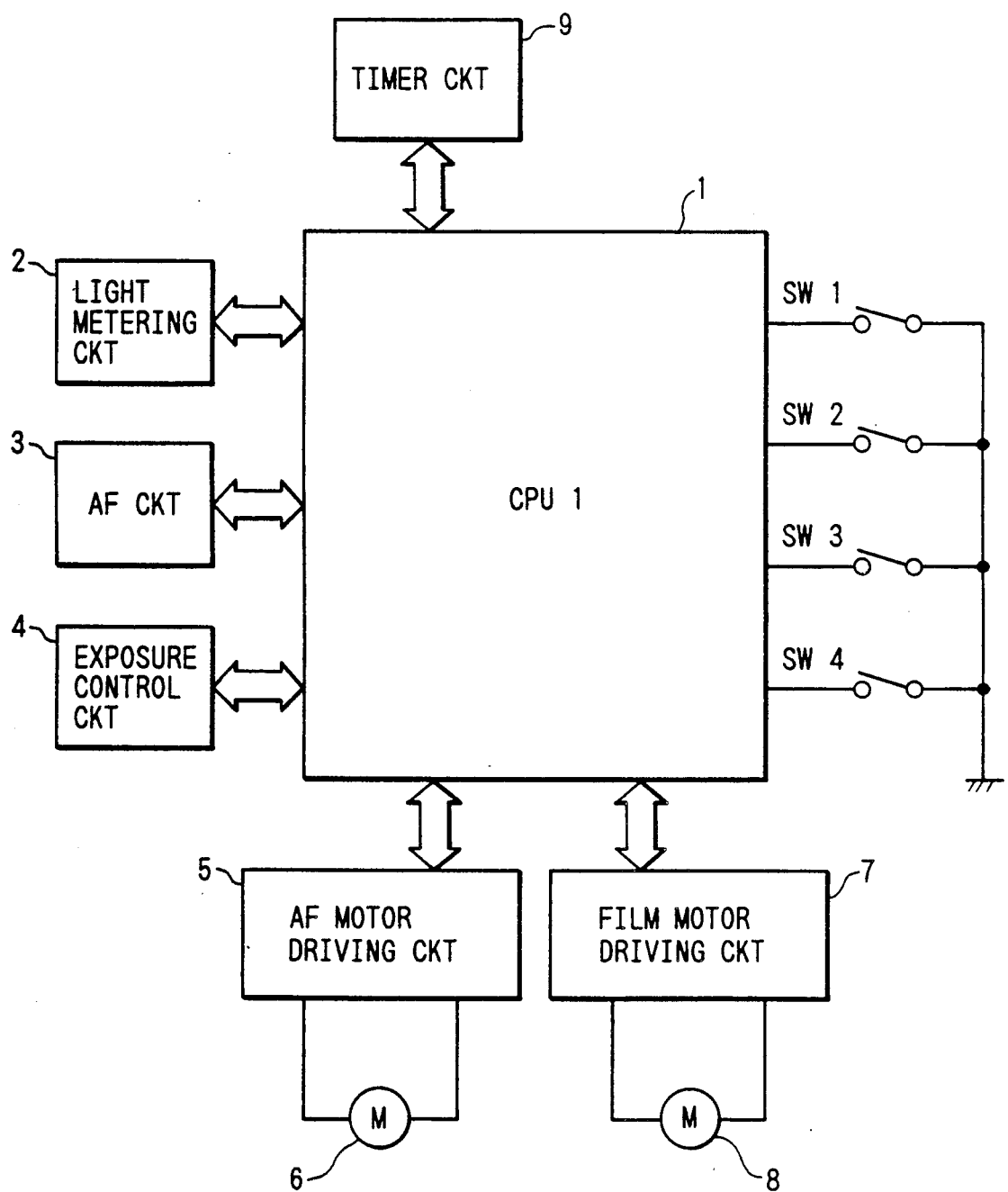

FIG. 1 is a block diagram of an electrically operated camera which has the automatic focusing function, and in which the winding and rewinding of the film is conducted with motors. Referring to FIG. 1, a CPU 1 having a memory means is connected with a light metering circuit 2 as well as an automatic focusing (AF) circuit 3. The light metering circuit 2 is connected with a light-receiving element (not shown) for receiving light from the subject, and operates to calculate, on the basis of the detection output of the light-receiving element, photometric data on the brightness of the subject, then output the data to the CPU 1. The AF circuit 3 is an automatic focusing circuit employing the so-called active range-finding method. The AF circuit 3 is connected with a light projector for projecting light through a projection lens onto the subject, as well as a light-receiving element for receiving the light reflected by the subject through the light-receiving lens (none of the light projector, the projection lens, the light-receiving element, or the light-receiving lens being shown); and the AF circuit operates to calculate, on the basis of the detection signal of the light-receiving element, range-finding data (focusing data) in accordance with the distance to the subject, then output the data to the CPU 1.

Also connected with the CPU 1 are an AF motor 6 associated with an AF motor driving circuit 5, a film motor 8 associated with a film motor driving circuit 7, an exposure control circuit 4, and a timer circuit 9. The camera includes four switches SW1 to SW4. SW1 is turned on by a halfway depression (the preliminary operation) of an externally-operated shutter release button (not shown) so as to supply power to the CPU 1 and its peripheral circuits. The switch SW2 is turned on by a full depression of the release button (the release operation) so as to effect the exposure sequence. The switch SW3 is turned on when the film is to be manually rewound (SW3 thus being a switch provided for a manual U-turn mechanism). The switch SW4 is disposed on the film feed passage of the camera body, and operates in such a manner that, when the film feed condition is detected from free sprocket-holes (not shown), the switch SW4 outputs, in accordance with the sprocket rotation, a pulse signal FSS having a duration corresponding to the feed of one frame of the film.

OPERATION OF CAMERA IN ITS FILM LOADED STATE

When rewinding is completed via either the automatic U-turn, whereby a film rewind action is automatically effected after the completion of photography with respect to all the frames of a film, or via the manual U-turn, whereby the film is manually rewound by the user at will after the completion of photography with respect to all or part of the frames of the film, a film rewind end flag FRE is set in the CPU 1. Upon the setting of the flag FRE, the CPU 1 operates to prevent the switch SW2 from being turned on by the release button. (this operation is called "release lock").

If the flag FRE is not set, the CPU 1 causes the operation of the AF circuit 3, and stores, in its memory, the range-finding data from the circuit 3. Subsequently, the CPU 1 calculates, on the basis of the stored range-finding data, the stroke through which the photography lens (not shown) is to be moved, then drives the AF motor 6 through the AF motor driving circuit 5 so that the photography lens is moved to the focusing position. Thereafter, the upon the turning-on of the switch SW2, the CPU 1 causes the operation of the light metering circuit 2, performs, on the basis of the resultant data, the AE calculation, and drives, through the exposure control circuit 4, exposure control members such as the stop and the shutter, so as to effect a photography operation. After the photography, the CPU 1 causes the action of winding the film by one frame by rotating the film motor 8.

If, during this film winding action, no FSS, indicative of the film feed condition, is detected, the CPU 1 determines that the terminal end of the film has been reached, and it causes the action of rewinding the film by reversely rotating the film motor 8. If an FSS is detected when the film is being wound by one frame, the CPU 1 sets the camera standing by for the next release action.

If, during the rewinding of the film, an FSS is detected, the CPU 1 completes the process and sets the film rewind end flag FRE.

OPERATION OF CAMERA IN ITS FILM UNLOADED STATE

When the switches SW1 and SW2 are turned on in response to the operation of depressing the release button, the exposure sequence as well as a film wind action by the film motor 8, which should correspond to one frame of a film, take place in the camera in the manner described above. Actually, however, no film is loaded in the camera. Therefore, no FSS is detected during the film wind action. The camera regards the film as being in its terminal end position, and automatically effects a film rewind action. Also in this film rewind action, no FSS is detected. In such cases, the camera determines that no film is loaded. This determination is followed by the setting of a film wind refraining flag NFR whereupon control is entered so that no release lock is effected. By virtue of this arrangement, when no film is loaded in the camera, it is possible to effect a release action whenever desired, thereby allowing various actions of the camera to be checked.

EXPLANATION OF CONTROL WITH REFERENCE TO FLOWCHARTS

Explanations will now be given on the above-described operations with reference to flowcharts shown in FIGS. 2 to 4 to show the program in accordance with which control is performed within the CPU 1.

Before proceeding to those explanation, various flags and symbols used in the flowcharts are defined as follows:
FRE film rewind end flag
MUS manual U-turn switch
NFR film wind refraining flag
FR film rewind flag
FSS free sprocket-hole signal
RFS film present, film rewind flag The program is started when the halfway depression switch SW1 or the manual U-turn mechanism actuation switch SW3 is turned on.

MAIN ROUTINE

Figure 2:
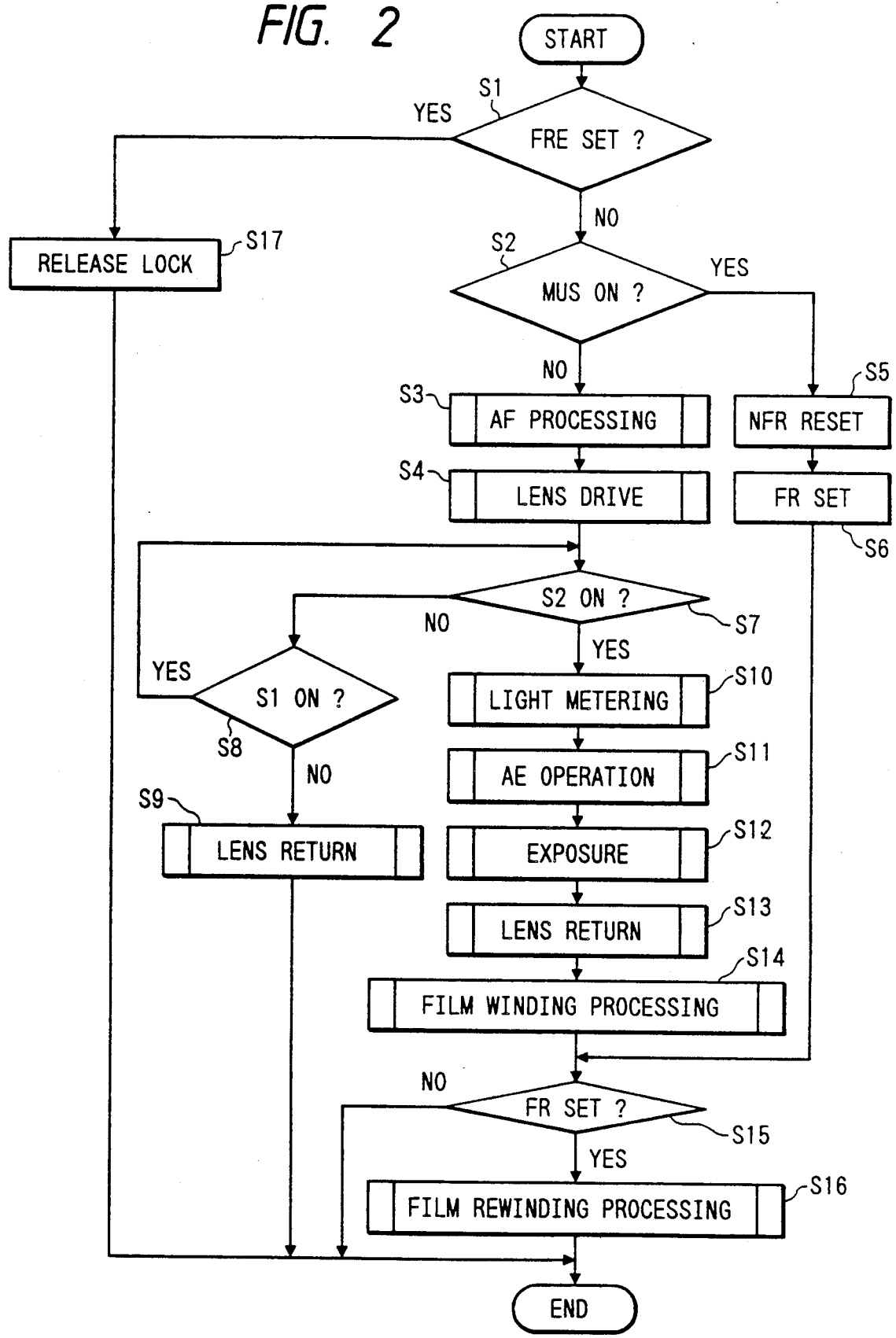

Referring to FIG. 2, in Step S1, it is determined whether the film rewind end flag FRE is set or not. The answer is affirmative if a film is loaded in the camera and, simultaneously, if the rewinding of the film has been completed after the completion of an automatic U-turn or manual U-turn. In this case, Step S17, is executed to effect release lock, and this is followed by the termination of the execution of the program. If a negative answer is obtained in Step S1, Step S2 is executed, in which it is determined whether the manual U-turn mechanism actuating switch SW3 is turned on or not. If the answer is affirmative, Step S5 is executed in which the film wind refraining flag NFR is reset. Subsequently, in Step S6, the film rewind flag FR is set. This is followed by the execution of Step S15, described later.

If the answer is negative in Step S2, photography actions successively take place in response to the halfway depression of the release button. In Step S3, range-finding data from the AF circuit 3 is read, the lens movement stroke is calculated on the basis of the range-finding data, and the result of this calculation is stored in the memory. Subsequently, Step S4 is executed, in which, on the basis of the result of calculation stored in the memory in Step S3, the AF motor 6 is driven through the AF motor driving circuit 5 in such a manner that the photography lens is moved to the focusing position. Thereafter, Step S7 is executed.

In Step S7, it is determined whether or not the switch SW2 is turned on by the full depression of the release button. If the answer is negative, Step S8 is executed, in which it is determined whether or not the switch SW1 is turned on. If the answer is affirmative, the step S7 is executed again.

If the answer to the question of Step S8 is negative, that is, if the release button is not depressed, Step S9 is executed, in which the AF motor 6 is driven through the AF motor driving circuit 5 in such a manner that the photography lens at the focusing position is returned to its reset position. This is followed by the termination of the execution of program.

If the answer to the question of Step S7 is affirmative, Step S10 is executed, in which light metering data from the light metering circuit 2 is read, and the data is then stored in a memory. Subsequently, in Step S11, calculation is performed on the basis of the light metering data stored in the memory in Step S10, and the result of this calculation is stored in a memory. Subsequently, in Step S12, on the basis of the result of the calculation stored in Step S11, the exposure control members such as the stop and the shutter are driven through the exposure control circuit 4 so as to effect photography exposure.

Thereafter, in Step S13, the AF motor 6 is driven through the AF motor driving circuit 5 in such a manner that the photography lens at the focusing position is returned to its reset position. Subsequently, Step S14 is executed. Step S14 is a film winding routine. In order to execute this process, the program proceeds to Step S101 shown in FIG. 3.

FILM WINDING ROUTINE

Figure 3:
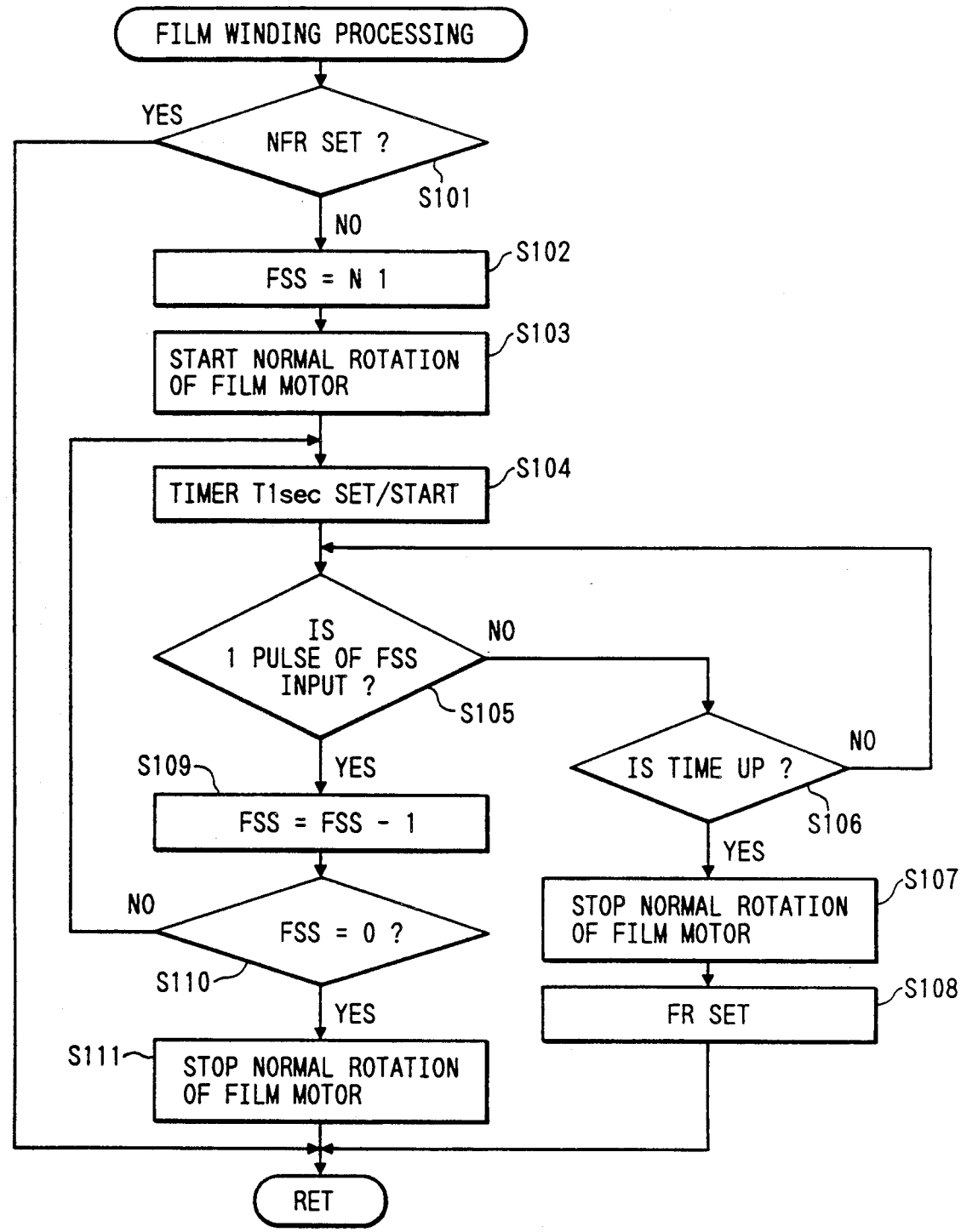

Referring to FIG. 3, in Step S101, in order to determine whether or not the winding of one frame of the film is completed to allow the next photography operation, it is determined whether or not the film wind refraining flag NFR is set. If the answer is affirmative, this means that a film wind action is completed. Therefore, the execution of this routine is terminated, and the program returns to Step S15 shown in FIG. 2.

If a negative answer is obtained in Step S101, Step S102 is executed, in which the count value of the free sprocket-hole signal is set to the number N1 corresponding to one frame. Subsequently, in Step S103, the normal rotation of the film motor 8 is started through the film driving circuit 7.

Subsequently, in Step S104, a predetermined time T1sec, which is equal at least to the time necessary to the winding of one frame, is set, and the measurement of the time T1sec by the timer circuit 9 is started. Thereafter, Step S105 is executed.

In Step S105, it is determined whether one pulse of the free sprocket-hole signal FSS is input or not. If the answer is affirmative, Step S109 is executed, in which the count value of the FSS is decremented by one. Subsequently, in Step S110, it is determined whether the current count value of the FSS is equal to zero or not. If the answer is negative, Step S104 is executed again. If the answer to the question of Step S110 is affirmative, this means that the winding of the film by one frame is completed. In this case, Step S111 is executed, in which the normal rotation of the film motor 8 driven through the film motor driving circuit 7 is stopped, whereupon the execution of this routine is terminated. Thereafter, the program proceeds to Step S15 shown in FIG. 2.

On the other hand, if the answer to the question of Step S105 is negative, Step S106 is executed, in which it is determined whether or not the timer circuit 9 has completed the measurement of the time T1sec. If the answer is negative, Step S105 is executed again. If the answer to the question of S106 is affirmative, the fact is either the terminal end of the film is reached during the film winding or no film is loaded in the camera. In this case, Step S107 is executed.

In Step S107, the normal rotation of the film motor 8 through the motor driving circuit 7 is stopped. Subsequently, Step S108 is executed, in which the film rewind flag FS is set, thereupon terminating the execution of this routine. Thereafter, the program proceeds to Step S15 shown in FIG. 2.

In Step S15, shown in FIG. 2, it is determined whether or not the film rewind flag FR is set. If a negative answer is obtained, the execution of the program is terminated, and the program is started anew. On the other hand, if an affirmative answer is obtained, Step S16 is executed. Step S16 is a film rewinding routine, the process shown in FIG. 4. Thus, if the answer to the question of Step S15 is affirmative, the program proceeds to Step S112, shown in FIG. 4.

FILM REWINDING ROUTINE

Figure 4:
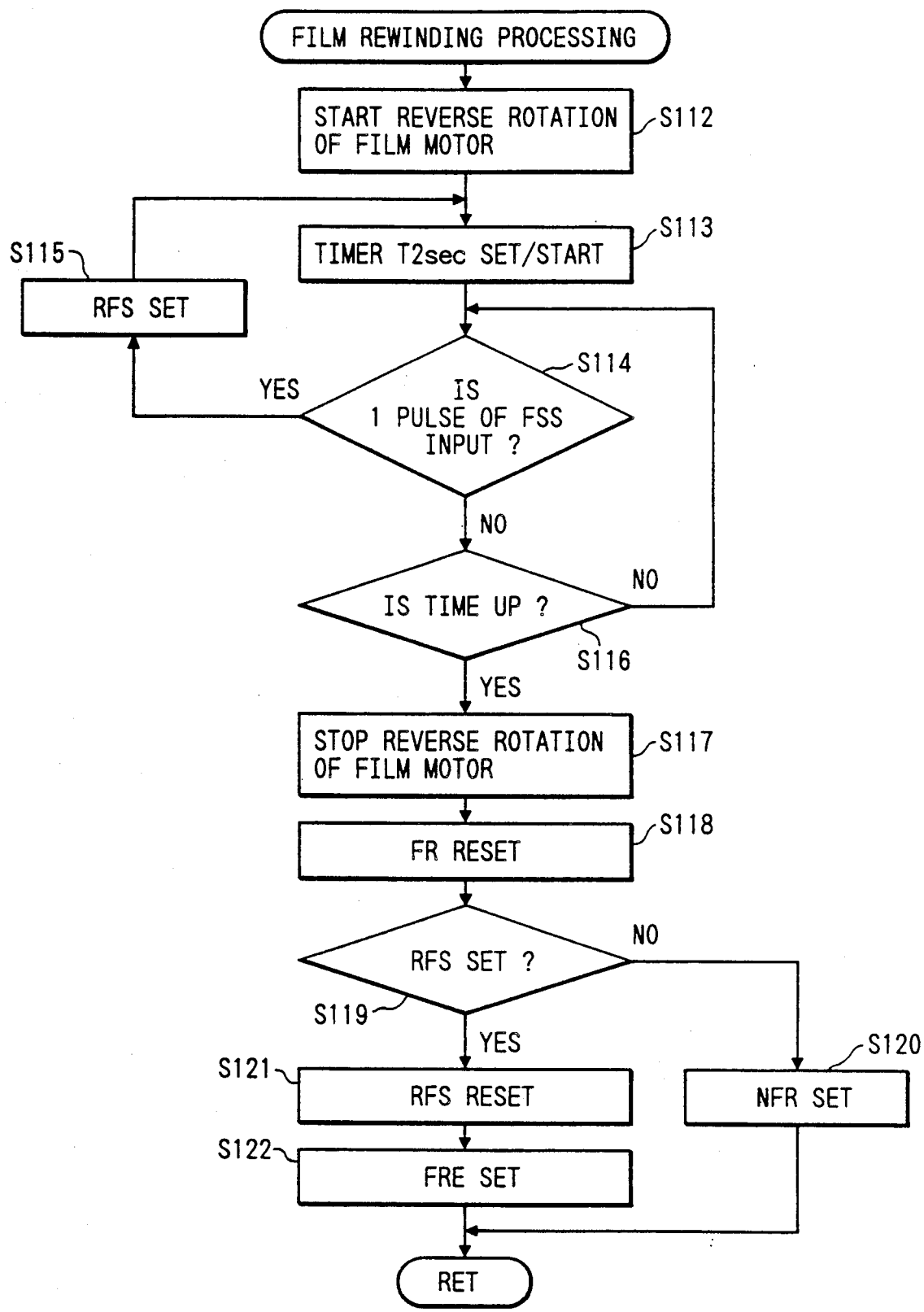

Referring to FIG. 4, in Step S112, the reverse rotation of the film motor 8 is started through the film motor driving circuit 7, thereby starting a film rewind action. Subsequently, Step S113 is executed.

In Step S113, a predetermined time T2sec is set, and the timer circuit 9 starts measuring the time T2sec. Subsequently, Step S114 is executed. In Step S114, it is determined whether or not one pulse of the free sprocket-hole signal FSS is input or not, so as to determine whether a film is present or not. If an affirmative answer is obtained, Step S115 is executed. In Step S115, the film present, film rewind flag RFS is set as an indication that a film is loaded. Thereafter, Step S113 is executed again.

If the answer to the question of Step S114 is negative, Step S116 is executed, in which it is determined whether or not the measurement of the time T2sec by the timer circuit 9 is completed. If a negative answer is obtained in this step, Step S114 is executed again. If the answer to the question of Step S116 is affirmative, Step S117 is executed, in which the reverse rotation of the film motor 8 through the film motor driving circuit 7 is stopped. In this way, in Steps S114, S116, and S117, the reverse rotation of the film motor 8 is stopped if the fact is either the rewinding of the film is completed or no film is loaded in the camera.

Thereafter, in the subsequent Step S118, the film rewind flag RF is reset. Subsequently, Step S119 is executed.

In Step S119, in order to determine whether film is present or not, it is determined whether the film present, film rewind flag RFS is set or not. If the answer is negative, that is, if no film is loaded, the film wind refraining flag NFR is set in Step S120, thereupon terminating the execution of the film rewinding routine shown in FIG. 4. Thereafter, the program returns to FIG. 2, and the execution of the program is terminated.

On the other hand, if the answer to the question of Step S119 is affirmative, the rewinding of the film is completed. In this case, Step S121 is executed to reset the film present, film rewind flag RFS. Subsequently, in Step S122, the film rewind end flag FRE is set. This is followed by return from the routine shown in FIG. 4 to the main routine shown in FIG. 2, and the execution of the program is terminated.

As described above, according to the foregoing embodiment, during the film rewinding process, it is determined whether a film is present or not. If a film is loaded in the camera, when the rewinding of the film is completed, release lock is effected to lock the shutter release button. If a film is not loaded, when the film rewind action is completed, the shutter release button is not locked but is able to be actuated, thereby enabling the checking of various actions of the camera.

Another embodiment, different from the foregoing, will be described while avoiding redundancy.

In the second embodiment, in contrast with the first embodiment, a film wind action is so arranged as to achieve an object and effects which are similar to those of the first embodiment. That is, in the second embodiment, during the film winding process, it is determined whether a film is present or not. If a film is loaded in the camera, when the rewinding of the film is completed, release lock is effected to lock the shutter release button. If a film is not loaded, without effecting a film rewind action, the shutter release button is not locked but is able to be actuated, thereby enabling the checking of various actions of the camera.

Specifically, the determination is performed in the following manner. In the film winding routine shown in FIG. 3, if a film is loaded in the camera, an FSS is detected during the winding of the film. On the basis of this detection, it is ascertained that a film is loaded in the camera. On the other hand, if no film is loaded in the camera, this inevitably results in no FSS being detected during the film wind action.

The second embodiment includes the following arrangement after the above-described determination. If a film is loaded, when the terminal end of the film has been reached during the film wind action, the FSS signal cases to be input from the SW4 to the CPU 1. Upon detection of this fact, therefore, the winding of the film is stopped. The arrangement is such that, after the completion of a film rewind action, release lock is effected to lock the shutter release button. On the other hand, if no FSS signal is output during the film wind action, this can mean that no film is loaded in the camera. Therefore, the winding of the film is stopped. Thereafter, the arrangement is such that, without effecting a film rewind action, the release lock of the shutter release button is not effected.

In practice, however, if no FSS signal is output during a film wind action, this comes from either of the following two different causes. One cause is that no film is loaded in fact. The other is that even though a film is loaded, the FSS signal is not output for some reason or other at the terminal end of the film. Therefore, there is a risk that an incorrect determination may be made as to the presence or absence of film.

Specifically, if no FSS signal is output during a film wind action even though a film is loaded actually, one of the possible cases is the case where the end of a frame which has been wound in the last film wind action exactly falls on the terminal end of the film itself. If such is the case, after a photography operation with respect to the frame, no FSS signal is output when another film wind action is conducted. In such cases, therefore, there is the risk that the CPU 1 may incorrectly determine that no film is loaded.

In order to avoid incorrect determination in the above-described cases, the following arrangement may be adopted in the second embodiment. Whenever no FSS signal is output, a film rewind action is performed for a predetermined time (the time being set at a time within which the FSS signal will surely be output as the rewind action proceeds). If no FSS signal is output also during the rewind action, it is determined that no film is loaded. Conversely, if the FSS signal is output, it is determined that a film is loaded. With this arrangement, it is possible to correctly determine the presence or absence of film during a film wind action.

The adoption of the above-described arrangement enables the presence or absence of film to be correctly determined during a film wind action. If no film is loaded, no excessive film rewind action is effected except that a film rewind action is performed for a relatively short period of time (i.e., for the above-described predetermined time).

According to the present invention, in a camera which is devoid of a film detection SW and is capable of determining whether a film is loaded or not by detecting the film feed signal, during a film rewind action, it is determined, on the basis of the film feed signal, whether a film is loaded or not. If a film is loaded, release lock is effected to lock the shutter release means after the completion of the film rewind action. This makes it possible to avoid erroneous operations of the user. For instance, when all the frames have already been used in photography, it is possible to prevent the user from subjecting any of the frames to a further exposure, and make him realize that no more photography is possible with the film. On the other hand, if no film is loaded, after the film rewind action, the release means is not locked so that release actions are possible. This facilitates the user's checking of various actions of the camera, with no film loaded therein. These advantages are obtained if the film feed condition is alternatively detected during a film wind action.

What is claimed is:

1. An electrically operated camera comprising:
   a release means for effecting a shutter release action for the light exposure of a part of film;
   a film rewind means for effecting a film rewind action;
   a film feed detection means for detecting the rewinding action of the film being rewound by said film rewind means and for generating a rewind signal upon detection; and
   a control means which, when the rewind signal is received during the film rewind action by said film rewind means, prevents said release means from effecting a shutter release action after the completion of the rewind action, whereas, when no rewind signal is received during the film rewind action by said film rewind means, said control means permits said release means to effect a shutter release action after the completion of the rewind action.

2. An electrically operated camera according to claim 1, wherein said control means determines that a film is loaded when the rewind signal is received during the rewind action by said film rewind means, whereby said control means determines that no film is loaded when no rewind signal is received during the rewind action by said film rewind means.

3. An electrically operated camera according to claim 1, further comprising a film wind means for effecting a film wind action in response to the shutter release action by said release means, wherein said film feed detection means detects the winding action of the film being wound by said film wind means and generates a wind signal upon detection, and wherein said film rewind means effects a film rewind action when the wind signal has ceased to be present during the film wind action by said film wind means.

4. An electrically operated camera comprising:
a release means for effecting a shutter release action for the light exposure of a part of film;
a film wind means for effecting a film wind action in response to the shutter release action by said release means;
a film feed detection means for detecting the winding action of a film being wound by said film wind means and for generating a wind signal upon detection;
a film rewind means for effecting a film rewind action when the wind signal has ceased to be present during the wind action by said film wind means; and
a control means which, when the wind signal is received during the film wind action by said film wind means, prevents said release means from effecting a shutter release action after the completion of the film rewind action by said rewind means, whereas, when no wind signal is received during the film wind action by said film wind means, said control means renders said rewind means inoperative and permits said release means to effect a shutter release action.

5. An electrically operated camera according to claim 4, wherein said control means determines that a film is loaded when the wind signal is received during the wind action by said film wind means, whereas said control means determines that no film is loaded when no wind signal is received during the wind action by said film wind means.

6. An electrically operated camera according to claim 4, wherein said film feed detection means is capable of detecting the rewinding action of the film being rewound by said film rewind means and generating a rewind signal upon detection, and wherein said control means causes said rewind means to operate for a predetermined time when no wind signal is received during the wind action by said film wind means, said control means being operable in such a manner that if the rewind signal is received within a predetermined time during the rewind action by said rewind means, said control means causes the rewind action to be continued and prevents said release means from effecting a shutter release action after the completion of the rewind action, whereas if no rewind signal is received within a predetermined time during the rewind action by said rewind means, said control means renders said rewind means inoperative and permits the release action by said release means.

* * * * *